United States Patent
Bienstman et al.

(10) Patent No.: US 11,681,201 B2
(45) Date of Patent: Jun. 20, 2023

(54) TRAINING OF PHOTONIC RESERVOIR COMPUTING SYSTEMS

(71) Applicants: UNIVERSITEIT GENT, Ghent (BE); IMEC VZW, Leuven (BE)

(72) Inventors: Peter Bienstman, Ghent (BE); Andrew Katumba, Ghent (BE); Jelle Heyvaert, Ghent (BE); Joni Dambre, Destelbergen (BE); Matthias Freiberger, Lichtervelde (BE)

(73) Assignees: UNIVERSITEIT GENT, Ghent (BE); IMEC VZW, Leuven (BE)

( * ) Notice: Subject to any disclaimer, the term of this patent is extended or adjusted under 35 U.S.C. 154(b) by 695 days.

(21) Appl. No.: 16/617,187

(22) PCT Filed: May 26, 2018

(86) PCT No.: PCT/EP2018/063857
§ 371 (c)(1),
(2) Date: Nov. 26, 2019

(87) PCT Pub. No.: WO2019/219839
PCT Pub. Date: Dec. 6, 2018

(65) Prior Publication Data
US 2020/0410370 A1 Dec. 31, 2020

(30) Foreign Application Priority Data
May 29, 2017 (EP) .................................. 17173169

(51) Int. Cl.
G02F 3/02 (2006.01)
G06N 3/067 (2006.01)
(Continued)

(52) U.S. Cl.
CPC ............. G02F 3/028 (2013.01); G02B 6/125 (2013.01); G02B 6/1228 (2013.01);
(Continued)

(58) Field of Classification Search
CPC ................................ G02F 3/028; G06N 20/00
See application file for complete search history.

(56) References Cited

U.S. PATENT DOCUMENTS
2017/0116515 A1 4/2017 Abel et al.

FOREIGN PATENT DOCUMENTS
EP 2821942 * 1/2015 ............. G06N 3/067
EP 2821942 A2 1/2015
EP 2821942 A3 5/2016

OTHER PUBLICATIONS
Vandoorne et al., "Parallel Reservoir Computing Using Optical Amplifiers," IEEE Transactions on Neural Networks, vol. 22, No. 9, Sep. 11, 2011, pp. 1469-1481.
(Continued)

Primary Examiner — Michael H Hong
(74) Attorney, Agent, or Firm — Workman Nydegger

(57) ABSTRACT

A photonics reservoir computing system is described. The system is configured for propagating at least one optical signal so as to create resulting radiation signals in the output channels. The photonics reservoir computing system further comprises weighting elements for weighting signals from the output channels, and at least one optical detector for optically detecting signals from the output channels. The system is adapted for estimating signals from the output channels through an output of the optical detector.

9 Claims, 7 Drawing Sheets

(51) Int. Cl.
  *G06N 20/00*  (2019.01)
  *G06N 5/04*  (2023.01)
  *G02B 6/125*  (2006.01)
  *G02B 6/122*  (2006.01)

(52) U.S. Cl.
  CPC ............. *G06N 3/0675* (2013.01); *G06N 5/04* (2013.01); *G06N 20/00* (2019.01)

(56) References Cited

OTHER PUBLICATIONS

Fiers et al., "Time-Domain and Frequency-Domain Modeling of Nonlinear Optical Components at the Circuit-Level Using a Node-Based Approach," Optical Society of America, 2011, pp. 1-11.

Love et al., "Single-, Few-, and Multimode Y-Junctions," Journal of Lightwave Technology, vol. 30, No. 3, Feb. 1, 2012, pp. 304-309.

Akrout et al., "Parallel Photonic Reservoir Computing Using Frequency Multiplexing of Neurons," arxiv.org, Cornell University Library, Dec. 24, 2016, 20 Pages.

Katumba et al., "A Multiple-Input Strategy to Efficient Integrated Photonic Reservoir Computing," Springer: Cognitive Computing, vol. 9, Apr. 28, 2017, pp. 307-314.

Van Der Sande et al., "Advances in Photonic Reservoir Computing," De Gruyter: Nanophotonics, vol. 6, No. 3, 2017, pp. 561-576.

Katumba et al., "Neuromorphic Computing Based on Silicon Photonics and Reservoir Computing," IEEE Journal of Selected Topics in Quantum Electronics, vol. 24, No. 6, Nov./Dec. 2018, 10 Pages.

Zhang et al., "Integrated Photonic Reservoir Computing Based on Hierarchical Time-Multiplexing Structure," Tsinghua National Laboratory for Information Science and Technology, vol. 22, No. 25, Dec. 15, 2014, 15 Pages.

European Search Report from EP Application No. EP17173169, dated Nov. 15, 2017.

International Search Report & Written Opinion from PCT Application No. PCT/EP2018/063857, dated Aug. 10, 2018.

Dai et al., "Passive Technologies for Future Large-Scale Photonic Integrated Circuits on Silicon: Polarization Handling, Light Non-Reciprocity and Loss Reduction," Light: Science & Applications, vol. 1, 2012, pp. 1-12.

Van Der Sande et al., "Parallel Processing Using an Optical Delay-Based Reservoir Computer," Proceedings of Optical Diagnostics of Living Cells II, SPIE, vol. 9894, 2016, 6 Pages.

Office Action from Chinese Application No. 201880036058.8, dated Feb. 28, 2023.

\* cited by examiner

TRAINING OF PHOTONIC RESERVOIR COMPUTING SYSTEMS

FIELD OF THE INVENTION

The invention relates to the field of optical reservoir computing. More specifically it relates to methods and systems for training and using optical photonic reservoir computing systems with optical readout.

BACKGROUND OF THE INVENTION

The field of machine learning aims to teach computer systems how to perform complex tasks on previously unseen data, without explicitly programming them. Examples of such tasks are classification, regression or pattern recognition. The arsenal of available machine learning techniques is comprehensive.

For every application the most appropriate technique has to be selected, depending on the application's specific demands. One important class of techniques are the so-called artificial neural networks, that consist of a network of interconnected neurons. This idea was based on the structure of the human brain and how it processes information. One subclass of the neural networks, called recurrent neural networks (RNN), introduces a notion of memory to the network, by creating directed interconnection cycles between neurons. Because training these networks is rather difficult, reservoir computing (RC) was proposed as a methodology to ease RNN training. More recently however it has gained popularity as a computational paradigm to solve a variety of complex problems. It has been shown that RC performs very well on e.g. speech recognition and time series prediction.

RC implementations are typically software-based and rely on sequential algorithms to simulate signal propagation and manipulation throughout the network. The sequential character of this workflow sets a limit to the speed and power efficiency: simulating large reservoirs or extensive input sequences is both time intensive and very power consuming. The idea of exploiting the intrinsic parallel nature of reservoirs has triggered an interest in feasible hardware implementation technologies. A wide variety of RC realisations in hardware have been proposed so far. An interesting candidate technology definitely is the field of photonics, which led to the concept of photonic reservoir computing (PRC). The most important advantages of light as an information carrier are the very high carrier frequency of optical signals, their inherent parallelism and the fact that optical signals can be carried over dielectric materials with low loss. The use of optical signals hence enables faster (and strong parallel) information processing and holds the promise of lower power consumption than electronic implementations. To save power, a passive PRC implementation was presented in K. Vandoorne et al. *Nat. Commun.*, 5 (2014) 3541, that made use of grating couplers, MMIs and delays. Unfortunately, these components introduce severe losses in the reservoir that set a limit to the size of the reservoir (i.e. the number of neurons). More particularly, due to the structure of the network involving Y-splitters/combiners, because of basic physics, every time two paths converge in a node, one loses on average 50% of the light, which is radiated away, and therefore lost, as shown in FIG. 2. The larger the network, the more of these combiners are encountered, which means that the information decays rapidly and is not able to reach the other end of the network. E.g., in the system as described by Vandoorne et al. in *Nat. Commun.* 5 (2014) 3541, even though the network contained 20 nodes, one was only able to measure 12 of them, since for the other nodes, the power had dropped beyond the noise floor.

Because the complexity of tasks the reservoir can perform depends on the number of neurons it consists of, these losses also limit the complexity of tasks that can be performed, and consequently there is still room for improvement.

SUMMARY OF THE INVENTION

It is an object of embodiments of the present invention to provide efficient photonic reservoir computing methods and systems with a fully optical readout.

It is an advantage of embodiments of the present invention that the systems allow for upscaling to a large number of nodes, since the highly efficient processing can be obtained.

It is an advantage of embodiments according to the present invention that use can be made of training method that does not require exact knowledge of the system states, but is able to reconstruct them in an efficient way by using a particular training sample multiple times.

It is an advantage of embodiments of the present invention that a readout structure is provided that uses very little power, resulting in an efficient system.

It is an advantage of embodiments of the present invention that pn junctions only use very small power, i.e. the power corresponding to the leakage current.

It is an advantage of embodiments of the present invention that the number of photodiodes required can be small or even restricted to one, resulting in a system comprising a limited number of components It is an advantage of embodiments according to the present invention that use can be made of the well-known silicon photonics technology, resulting in well-known processing methods for manufacturing the system.

The present invention relates to a photonics reservoir computing system, the photonics reservoir computing system comprising a plurality of output channels and being configured for propagating at least one optical signal so as to create resulting radiation signals, the photonics reservoir computing system further comprising weighting elements for weighting signals from the output channels, and at least one optical detector for optically detecting, the system being adapted for estimating signals from the output channels through an output of the at least one optical detector.

The photonic reservoir computing system may in some embodiments be a passive photonic reservoir computing system, although also systems with active elements in the reservoir are within the scope of the claimed invention.

In some embodiments, the photonics reservoir computing system may comprise a plurality of discrete nodes interconnected via optical interconnections for propagating at least one optical signals between the nodes so as to create resulting radiation signals. In other embodiments the photonics reservoir computing system may be based on a chaotic reservoir.

It is an advantage of embodiments of the present invention that an efficient read-out is obtained, allowing more efficient use of the photonics reservoir computing system.

The system may comprise a training module for determining a power of different output channels in the system and a phase difference between different channels in the system.

The training module may be configured for iterating over training data several times while setting weights via the weighting elements according to a predetermined pattern.

The system may be adapted for estimating the amplitude and phase of the weighted resulting radiation signals by at most 3F−2 iterations over the training data, wherein F is the number of output channels.

The weighting elements may be adapted for weighting the resulting radiation signals and the at least one optical detector may be adapted for optically detecting a combination of the weighted resulting radiation signals after the signals have been weighted in the optical domain, the system being adapted for estimating the weighted resulting radiation signals.

The optical detector may in some embodiments be a large area optical detector, although embodiments are not limited thereto.

The optical detector may be configured for performing a non-linear operation on the weighted resulting radiation signals.

Performing a non-linear operation may comprise taking the power of the weighted resulting radiation signals prior to summing the weighted resulting radiation signals.

The weighting elements may comprise reverse biased pn junctions for weighting the resulting radiation signals.

The at least one optical detector may comprise a plurality of optical detectors for optically detecting in each output channel the resulting radiation signals and the weighting elements being adapted for weighting the optically detected resulting signals in the electrical domain. The system may be adapted for summing the weighted the optically detected resulting signals in the electrical domain.

The training module may be configured for obtaining training data whereby weighting coefficients are selected by subsequently selecting one of the weighting coefficients equal to 1 (a.u.), while setting all other weighting coefficients to 0, and by selecting two of the weighting coefficients non-zero, while setting all other weighting coefficients to 0.

The system may in some embodiments comprise a plurality of discrete nodes interconnected via optical interconnections for propagating at least one optical signal between the nodes so as to create the resulting radiation signals.

The system may comprise at least one multimode junction configured for connecting at least three multimode waveguides using a taper section wherein the taper section is not perfectly adiabatic.

Systems according to embodiments as described above may also comprise the features of a photonics reservoir computing system comprising an optical multimode waveguide based structure comprising a plurality of discrete nodes and a plurality of passive multimode waveguide interconnections between the nodes for propagating at least one photonic signal between the nodes, in which each discrete node is adapted for passively relaying the at least one photonic wave over the passive multimode waveguide interconnections connected thereto, wherein the optical waveguide based structure comprises at least one multimode junction configured for connecting at least three multimode waveguides using a taper section wherein the taper section is not perfectly adiabatic.

In case three waveguides are connected, the multimode junction may be referred to as a multimode Y-junction. It is an advantage of embodiments of the present invention that because of the multimodality of the involved waveguides a portion of radiation that was converted in a higher order mode in the waveguide structure is still guided in the waveguide structure and therefore is not lost. It is an advantage of embodiments of the present invention that a more rich system is obtained, having more degrees of freedom, if e.g. each mode is read out individually. This may result in a better classification performance. It is an advantage of embodiments of the present invention that if a taper section offers a less smooth evolution towards the output waveguide, not all power will stay within the same mode but power can be scattered to supported (guided) modes. In this way the radiation, and corresponding power, is not scattered out of the structure.

It is an advantage of embodiments of the present invention that a compact solution is provided.

It is an advantage of embodiments of the present invention that systems are provided that show large topological freedom as well as good speed.

It is an advantage of embodiments of the present invention that it provides efficient systems that can be implemented on larger scale.

Where in embodiments of the present invention reference is made to a plurality of nodes, reference is made to at least two nodes, advantageously at least three nodes, more advantageously at least 5 nodes.

The nodes may be configured for performing the plurality of splitting and/or combining in the photonics reservoir computing system via multimode junctions configured for connecting at least three multimode waveguides using a non-perfect adiabatic taper section.

It is an advantage of embodiments of the present invention that higher efficiencies can be obtained. It is furthermore to be noted that a small increase of efficiency results in an overall large gain, since combining and splitting of waves occurs a plurality of times, i.e. a series of splitters and or combiners typically is used in optical computing reservoirs according to embodiments of the present invention.

The multimode junctions may be multimode Y-junctions for connecting three multimode waveguides.

The waveguides may have a width of e.g. at least 500 nm, advantageously at least 1000 nm. The width of the waveguides may be selected as function of the wavelength used, such that these support guiding multiple modes. It is an advantage of embodiments of the present invention that by using more broad waveguides, multiple guiding modes are supported.

The taper length may be between 2 µm and 2.5 µm. The taper length may be selected as function of the wavelength used, such that these support guiding multiple modes.

Other parameters that may tune the adiabaticity are for example taper width and angle between the outgoing waveguides in case of a splitter or incoming waveguides in case of a combiner.

The optical waveguide based structure may be configured for performing weighting of resulting radiation signals in the optical domain and wherein the system is configured for combining the weighted signals using multimode Y-junctions configured for connecting three waveguides using a taper section wherein the taper section is not perfectly adiabatic. It is an advantage of embodiments of the present invention that a readout structure is provided that uses very little power, resulting in an efficient system.

Nevertheless, systems according to embodiments of the present invention are not limited thereto, and can also be for example implemented in single mode reservoirs, other photonic reservoirs, etc.

The system may in some embodiments comprise a chaotic reservoir.

It is to be noted that the training module and weighting system as well as the corresponding methods are not limited to photonic reservoir computing systems but can be more broadly applied to photonic computing systems such as photonic wave-based computing systems.

Alternatively, continuous phase tuning could also be used in the training module for extracting weighting coefficients.

The system may comprise a silicon photonics reservoir. It is an advantage of embodiments according to the present invention that use can be made of the well known silicon photonics technology, resulting in well known processing methods for manufacturing the system. Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
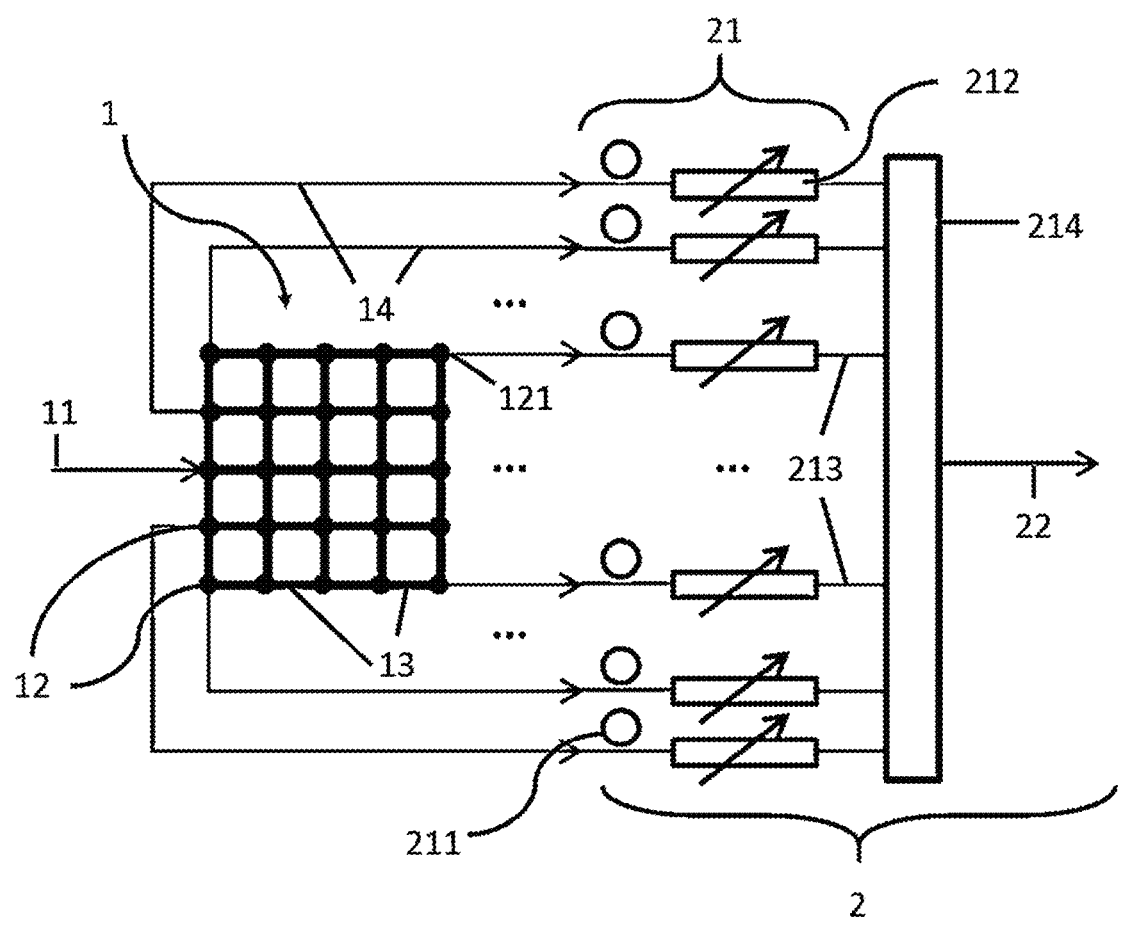
FIG. 1 illustrates the reservoir computing system and an attached module for training the outputs, as can be used in embodiments according to the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to Y-junction reference is made to a three-port device designed to split guided waves of a first port, the in-port, symmetrically or asymmetrically into guided waves of the two other ports, the out-ports, or to combine the guided waves of two ports, the in-ports, into a guided wave of the third port, the out-port. Furthermore a single-mode Y-junction is referred to as above Y-junction in which input and output ports are made of waveguides that only guide waves consisting of one single mode. In contrast thereto, a multimode Y-junction is referred to as above Y-junction in which at least one port contains a waveguide that supports guided waves comprising more than just one mode. It nevertheless is to be noted that in other embodiments of the present invention, the reservoir can be based on a chaotic reservoir and therefore the present invention also relates to embodiments without Y-junctions.

Where in embodiments of the present invention reference is made to non-perfectly adiabatic smooth tapers or tapering sections reference is made to smoothly tapered structures that change their shape over length scales not compatible with the adiabatic theorem. This means that the waveguide modes are significantly mixed, e.g. an important amount of energy confined to the ground state, the fundamental mode, is converted into the excitations of higher order modes, and the other way around. This process might include radiative losses and typically has lower conversion efficiencies than adiabatic tapering sections yielding single-mode conversion efficiencies close to 100%, e.g. greater than 98%. Non-perfectly tapers therefore may have a conversion efficiency smaller than 98%, e.g. smaller than 95%. It nevertheless is to be noted that in other embodiments of the present invention, the reservoir can be based on a chaotic reservoir and therefore the present invention also relates to embodiments without tapered sections.

In a first aspect, the present invention relates to a photonics reservoir computing system. Such a photonics reservoir computing system is adapted for propagating at least one optical signal so as to create resulting radiation signals in the output channels. In some embodiments, the reservoir computing system may comprise a plurality of discrete nodes interconnected via optical interconnections for propagating at least one optical signal between the nodes so as to create the resulting radiation signals. In other embodiments the reservoir may be a chaotic reservoir, without discrete nodes being present. According to embodiments of the present invention, the photonics reservoir computing system further comprises weighting elements for weighting signals from the output channels and at least one optical detector for optically detecting signals from the output channels. The system is adapted for estimating the signals from the output channels through an output of the at least one optical detector. In some embodiments, the weighting elements are adapted for weighting the resulting radiation signals, and the at least one optical detector is adapted for optically detecting a combination of the weighted resulting radiation signals after the signals have been weighted in the optical domain. In this way the system is adapted for providing a full optical readout. The latter is advantageous as it provides a very efficient readout and there is no need to first convert the signals into the electrical domain. The system according to embodiments of the present invention is adapted for estimating the weighted resulting radiation signals through an output of the large area optical detector.

In some other embodiments, the at least one optical detector comprises a plurality of optical detectors for optically detecting in each output channel the resulting radiation signals and the weighting elements are adapted for weighting the optically detected resulting signals in the electrical domain.

In some embodiments, the photonics reservoir computing system comprises a training module for determining a power of different channels in the system and a phase difference between different channels in the system. The system may be adapted for estimating the amplitude and phase of the weighted resulting radiation signals by at most 3F−2 iterations over the training data, wherein F is the number of output channels In some embodiments, the training module is also configured for iterating over training data several times while setting weights via the weighting elements according to a predetermined pattern.

In some embodiments, the optical detector may be configured for performing a non-linear operation on the weighted resulting radiation signals. Performing a non-linear operation may comprise taking the power of the weighted resulting radiation signals prior to summing the weighted resulting radiation signals.

In some embodiments the weighting elements may comprise reverse biased pn junctions for weighting the resulting radiation signals. In other embodiments, the weighting may happen in analog electronics, after the detectors.

The training module may in some embodiments be configured for obtaining training data whereby weighting coefficients are selected by subsequently selecting one of the weighting coefficients equal to 1 (a.u.), while setting all other weighting coefficients to 0, allowing determining the intensity, and by selecting two of the weighting coefficients non-zero, while setting all other weighting coefficients to 0 allowing determining phase, when combined with the intensity measurements.

In some embodiments, the training module and weighting system also may be combined with features of a photonics reservoir computing system comprising a plurality of discrete nodes and a plurality of passive multimode waveguide interconnections between the nodes for propagating the at least one photonic signal between the nodes. Further features may correspond with features of the system described below. A plurality of nodes may refer to at least 2 nodes, e.g. at least three nodes. Each discrete node is adapted for passively relaying the at least one photonic signal over the passive waveguide interconnections connected thereto. In one embodiment, the optical waveguide based structure may comprise at least one multimode junction configured for connecting at least three waveguides using a taper section wherein the taper section is not perfectly adiabatic. The junction may be a Y-junction in case of connection between three waveguides. More generally, the junction may be referred to as a N×M coupler, whereby N and M are different from each other. Depending on whether the number of inputs or the number of outputs being larger, the coupler may be referred to as a combiner respectively splitter.

By way of illustration, embodiments of the present invention not being limited thereto, standard and optional features will further be described with reference to FIG. 1 which shows a schematic drawing of the reservoir computing system 1, and to FIG. 2 displaying the general shape of Y-junctions 31, 32, 33 as used to split and combine light signals at the location of the nodes 12 inside the reservoir 1. Whereas in the present description Y-junctions will be used to explain features and advantages of embodiments of the present invention, the present invention is not limited thereby a more general N×M couplers also may be used, as also indicated above.

FIG. 1 demonstrates how the information carried by the input signal is processed by the reservoir system 1, and its readout mechanism 21 used to derive an output signal 22 as being part of the training module 2.

The reservoir computing system 1 of the example shown in FIG. 1 is conceived as a collection of nodes 12 which are interconnected via multimode waveguides 13. The multimode waveguides 13 can be fabricated in any suitable way. In the current example, the multimode waveguides 13 are implemented on a silicon chip and typically may be wider than 500 nm, ideally they are wider than or equal to 1000 nm if they are operated at wavelength around 1300 nm. The width of the waveguides typically may be one of the factors determining the multimode behavior of the waveguide. It is to be noted that the multimode waveguides may be implemented in any suitable material platform such as for example as semiconductor waveguides such as Si, SiN, polymer waveguides like SU8, glass substrates, . . . .

The nodes 12 of the reservoir computing system may be arranged on a regular grid as shown in FIG. 1, although embodiments are not limited thereto and also an irregular grid may be used. The more nodes 12 the reservoir system 1 contains the better its capacity to remember past signals and therefore its computational and predictive power. Optical signals traversing the reservoir computing system 1 as bound, guided modes inside the multimode waveguides 13 encounter a plurality of nodes 12 which repeatedly recombine, split and hence redirect them into new directions. A disadvantage of the repeated action of combining in existing prior art systems is the inherent loss the signal experiences after crossing several nodes 12, dropping quickly to the noise floor level where all the information carried by the signal is lost. This loss is an intrinsic characteristic of single-mode 50/50 splitters 31 when operated with coherent light in a single mode 321 in reverse direction to function as signal combiners 32, in case the input powers are not perfectly in phase. An example of a single mode splitter and a single mode combiner is illustrated in the two upper drawings of FIG. 2. On average in prior art systems 50% of the signal power is lost in such a pass because part of the combined signal constitutes a higher mode 322 at the output which is unguided and therefore radiates away. Embodiments of the present invention improve the overall reservoir system performance by introducing multimode junctions 33 as splitters and/or combiners located at the nodes 12 of the reservoir system 1, so that reduced losses occur. The latter will be described further below, with reference to FIG. 2.

Figure 2:
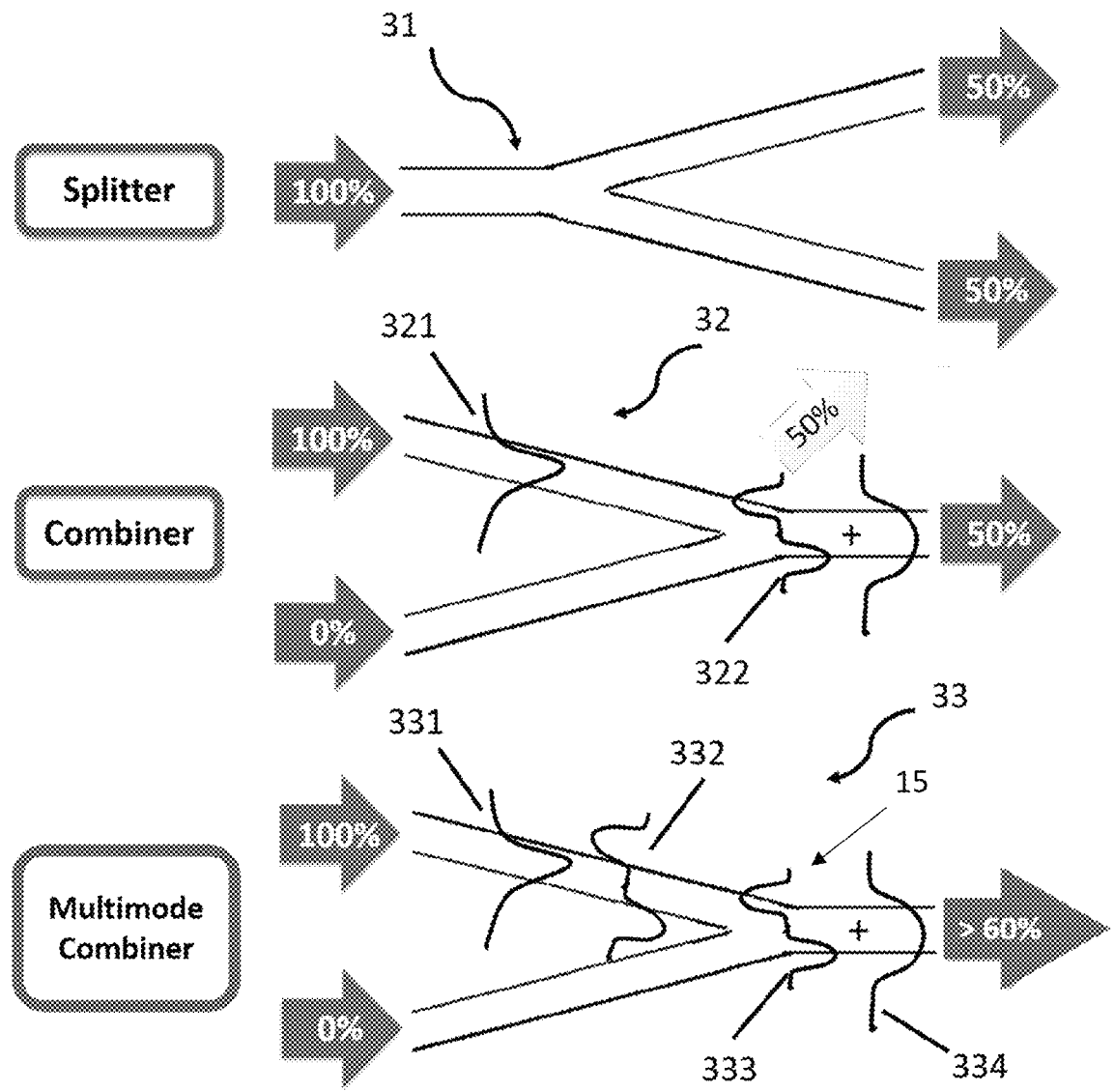
FIG. 2 is a schematic drawing of different Y-junctions used as splitters and combiners, illustrating features of the state of the art and of embodiments according to the present invention.

In FIG. 2, the lower drawing illustrates the example of a multimode combiner, whereby the combination of a multimode signal is shown. The junction 33 is not perfectly adiabatic and the input and output waveguides are also multimode. These support one or more higher order modes 332, 333 in addition to the fundamental waveguide modes 331, 334.

Referring again to FIG. 1, the reservoir computing system 1 receives one or more radiation input signals 11 which are varying in time and conveying encoded information external to the device. The radiation input signals 11 may be modulated free-space coupled light waves or modulated fiber coupled optical modes. All the radiation input signals 11 are injected into one or more reservoir nodes 12, for example through out-of-plane grating coupler elements or a single out-of-plane grating coupler element followed by a sequence of Y-junctions 33 that split up the incoming radiation signal 11. The input signal is represented in a high-dimensional feature space given as the collection of fields present and extracted 14 at one or more reservoir nodes 12. As the state of the reservoir computing system 1 is evolving in time, the original input signal 11 is spread out over the entire reservoir system 1, undergoing multiple combination and splitting events. The use of multimode Y-junctions 33 in combination with multimode waveguides is advantageous in light of the increased amount of total optical signal power retained inside the reservoir 1 after each of those events. It is an advantage of embodiments of the present invention that even remote nodes 121 of the reservoir 1 can become measurable whereas they were not in previous reservoir systems due to too strong losses experienced by radiation signals travelling along these paths. The extracted optical signals 14 are routed into and modified by the training module 2.

According to embodiments of the present invention, the system comprises a weighting scheme at the readout stage 21 which is implemented entirely in the optical domain. This has the advantage of reducing complexity and costs that would be incurred to the readout mechanism 21 if it was fully electronic.

One or more of the extracted optical signals 14 are multiplied by a complex weight by, for instance, first attenuating or amplifying the signal amplitude. In one particular example, attenuating the signal amplitude is obtained through a reduced transmissivity of a detuned microring cavity 211, and by subsequently applying a phase shift in a linear phase shifter region 212. In both cases the effective index of the multimode waveguide can be changed according to the refractive index changes induced by field inside a reverse-biased pn-junction. Reverse biased Pn-junctions have the advantage of much lower static power consumption over heater based phase shift solutions. Whereas heaters continuously draw current, the reverse-biased pn-junction only suffers from a tiny leakage current. Advantageously, all the weighted readout signals 213 are combined into a single output signal 22. In analogy to the use of multimode Y-junctions 33 in the reservoir system 1, the combination step can happen through a cascade 214 of for instance multimode Y-junctions 33 or tapering sections so as to reduce losses due to radiation modes. If the weighting scheme at the readout stage 21 is fully electronic, the combination step 214 may be fully electronic too, e.g. an electronic fan-in, but other implementations might be preferred. In case the desired output of the problem needs to be represented in the electrical domain, the output signal 22 should be converted into the electrical domain. This can be achieved by a photodiode which covers the final, wide multimode waveguide at the end of the combining stage 214. At the same time the photodiode will carry out a non-linear signal transformation mapping electromagnetic field strengths into power values. Non-linear behavior is required for certain applications of reservoir computing systems.

As noted above, the above example refers to a multimode waveguide-based reservoir but can be mutates mutandis applied to embodiments of the present invention using a chaotic reservoir.

The traditional reservoir computing training approach assumes that all the extracted optical signals 14 from the reservoir system 1 are observable and known. Embodiments of the present invention avoid this additional requirement, leading to a simplified training module 2 with only one output signal 22 which needs to be observed. This is achieved by an indirect determination of the extracted reservoir states 14 which is possible if training sequences 11 are presented multiple times to the reservoir system 1. Every time the training sample 11 is repeated, the complex weights may be changed as described below, illustrating an advantageous example of applying weights, embodiments not being limited thereto. Updating may for example be updating after the same input signal is presented a couple of times, e.g. 3.

Turn all the amplitude controlling weights 211 off by bringing them as close to zero as possible. Then activate a single amplitude controlling weight 211, e.g. the first one, and bring it as close to one as possible. The output signal 22 is then directly related to corresponding readout radiation signal 14, the relation being the non-linear squared norm operation of the photodetector converting the electric field strength into its corresponding power value (if necessary, the non-ideal transfer characteristic of the detector can be taken into account through calibration). Then repeat this procedure with all but the second weighting element turned off, and so forth.

In a second step the relative phase differences between all the extracted, optical reservoir output signals 14 are determined by selecting two of them at a time and switching them on, whereas the remaining ones are left in their off or zero states. The power value as given by the photodetector output 22 is recorded. Together with the prior extraction of the amplitude values of the extracted reservoir signals 14, this second measurement step allows the extraction of the relative phase difference between the two active reservoir output signals in 14. Finally, to be able to resolve a pi phase shift, a third measurement with two different non-zero input signals in the same 2 two input channels is performed. This step of three measurements is repeated with a second pair, and so forth.

This procedure of determining the reservoir output states 14 has the advantage of being faster than many brute-force black box optimization techniques. Instead of hundreds or thousands of iteration steps, the aforementioned method only requires O(3n) repetitions with n the number of extracted reservoir states 14.

As mentioned above, this procedure is subject to a primary characterization step which quantifies the amount of non-linear response of the photodetector as well as the voltage-phase shift curve of the pn-junctions.

By way of illustration, an example of an embodiment of the present invention is discussed, in the present example being illustrated with an optimization of a multimode Y-junction, showing standard and optional features and advantages of systems that can be used with computing reservoirs according to embodiments of the present invention, although embodiments are not limited thereto. The optimization of the multimode Y-junction in the present example is based on performance results, measured in percentage loss of the input optical power as a function of waveguide widths and taper lengths, for a standard design kit Y-junction (Ipkiss). This is achieved by numerical simulations using Lumerical MODE solutions software to simulate the Y-junction device response when used as a splitter or combiner. To this end the varFDTD method was selected, an auto non-uniform meshing strategy was chosen at level 5 accuracy and a conformal variant 1 mesh refinement was applied. In the example, the wavelength was set to 1300 nm and a silicon-oxide cladding of refractive index 1.4469 surrounding the 220 nm high silicon waveguide structure with material parameters according to Palik's model in the Lumerical material database was used, but the settings and materials are not limited to the current choices. The structures were simulated and small gains, i.e. reduced loss, was found for the multimode systems. Although the efficiency gain seemed modest, it benefits from the multiple node passes inside the reservoir system 1, hence is amplified exponentially. As a consequence, the invention enables larger reservoir systems with more nodes, a great freedom in design topologies, and better computational performance.

The multimode guiding effect was studied for a splitter as well as for a combiner, by varying the width of the waveguides and junctions used. By increasing the width of the waveguides and junctions used, more modes will be guided. At 600 nm width, the first two modes (i.e. fundamental and first order mode) are strongly guided. A third mode exist, but is guided less strong. A width of 800 nm the first three modes are well guided, but now a fourth mode (i.e. third order mode with effective index of 1.46 with a cladding index of 1.4469) is weakly guided. The situation for a 1000 nm wide waveguide has evolved further towards four well-guided modes and a fifth (i.e. the fourth order mode) that is barely guided with an effective index 1.4495. The last design, with a width of 1200 nm, guides this fourth order mode better and does not support the fifth order mode yet.

Losses thus were simulated for different structures having a different width (600 nm to 1200 nm) of the waveguides and the junction. The obtained results learned that for wider waveguides and junctions, the losses were substantially smaller than for smaller waveguides and junctions. The latter illustrates the positive effect of the use of multiple modes, since these wider designs support multiple modes. Based on these positive results, further optimisation was performed.

The effect of the taper design on the power losses were also studied. In the present example, the 1 µm width waveguide design was used to optimize the taper length. Simulations were performed for a combiner with taper lengths 0.1 µm, 2 µm and 2.5 µm.

The results are shown in the tables below for a combiner. SE thereby refers to single excitation, whereas DE refers to double excitation.

| Taper length | Transmission SE | Loss SE | Transmission DE | Loss DE |
|---|---|---|---|---|
| 0.1 µm | 53% | 47% | 58% | 42% |
| 1 µm | 56% | 44% | 60% | 40% |
| 2 µm | 61% | 39% | 63% | 37% |
| 2.5 µm | 55% | 45% | 61% | 39% |

Incoherent Combination of Relevant Modes for a Combiner (Fundamental, First Order, Second Order, Third Order TE Mode)

| Taper length | Transmission SE | Loss SE | Transmission DE | Loss DE |
|---|---|---|---|---|
| 0.1 µm | 49% | 51% | 68% | 32% |
| 1 µm | 57% | 43% | 63% | 37% |
| 2 µm | 82% | 18% | 89% | 11% |
| 2.5 µm | 77% | 23% | 81% | 19% |

Coherent Combination of Relevant Modes for a Combiner (Fundamental, First Order, Second Order, Third Order TE Mode)

The optimization has resulted in lower losses, as expected. This can be seen by comparing the original 0.1 m taper length to the other taper lengths. The reduction of loss saturates between 2.0 µm and 2.5 µm. After that, losses slightly increase again. This can be explained as follows. By making the taper longer, the modes in the taper section are offered more time to smoothly converge towards the output modes while not making the taper more adiabatic and thus destroying the beneficial effect of a less-adiabatic Y-junction in multimode regime. So, between taper lengths 2.0 and 2.5 µm an optimum is reached: the taper is long enough to maximally reduce the unwanted losses without losing too much adiabaticity. Beyond that point on one side, losses still are reduced caused by the taper design, but adiabaticity starts to improve too much, resulting in the beneficial effect getting reduced and thus in more radiation loss and light that scatters out. Beyond the balanced point on the other side, a taper with an adiabaticity that is so weak is obtained that it will not counter the losses, but even contribute to the loss. In other words Although further optimization can be performed, simulation results already show an average loss of only 39% (single excitation) and 37% (double excitation) for the combiner (all in case of incoherently combined mode sources), which is much better than what the MMIs (50% loss) in current reservoirs can offer. Note that these values and modes of operation are specific to the specific design studied here and could be different for other designs.

Figure 3:
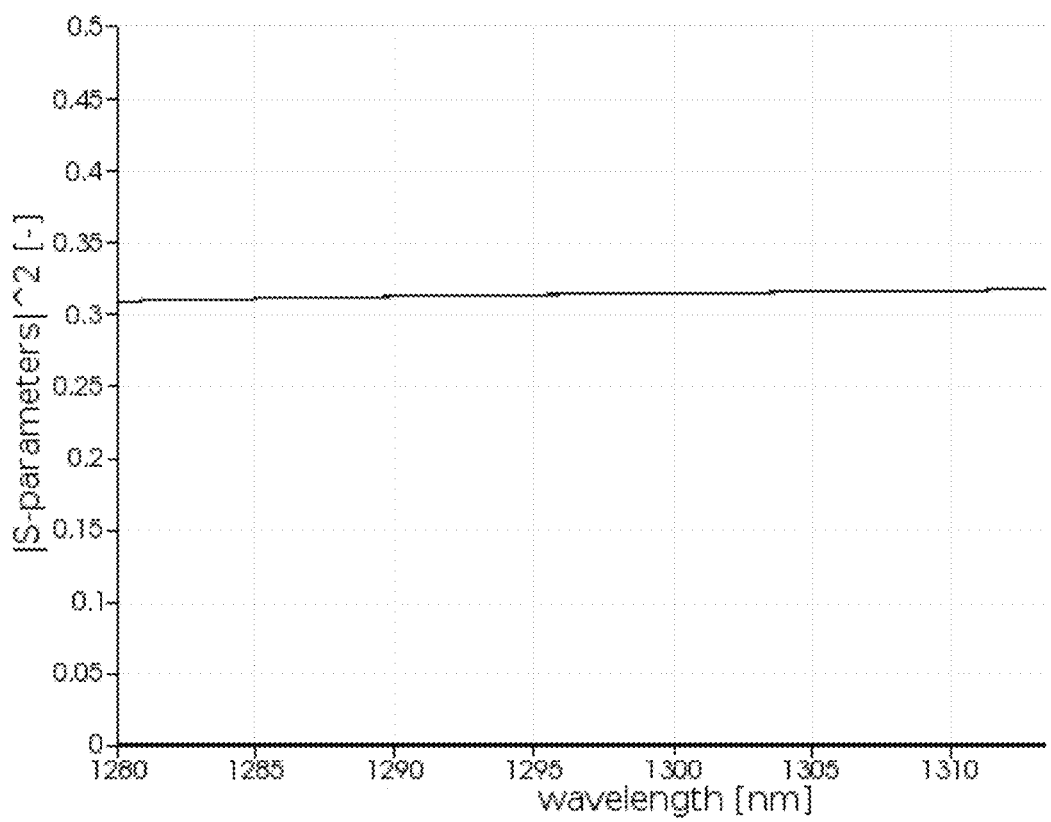
FIG. 3 illustrates the wavelength dependency of the efficiency of the reservoir computing system, according to an embodiment of the present invention.

Also the dependency of the wavelength used on the efficiency of the reservoir system was evaluated. The influence of the wavelength on the structure's behaviour was evaluated making use of the S-parameters, for a modelled simplified Y-junction. FIG. 3 illustrates the squared absolute value of the (complex) S-parameters of the Y junction as function of the wavelength whereby a 1 µm wide waveguide is used and the taper length was 2 µm. As an input, the fundamental mode was used. The wavelength is swept from 1280 up to 1320 nm, an interval around central frequency 1300 nm. These squared absolute values are a measure for the power flow corresponding to every S-parameter. It can be seen that the measured results correspond with substantially flat curves (almost horizontally oriented), illustrating that the wavelength does not have an important impact on the performance of the reservoir system. It is an advantage of embodiments of the present invention that variations in the wavelength used do not cause much variation on the performance of the system. This is in contrast to other approaches which use e.g. directional couplers, which are much more wavelength dependent.

Figure 4:
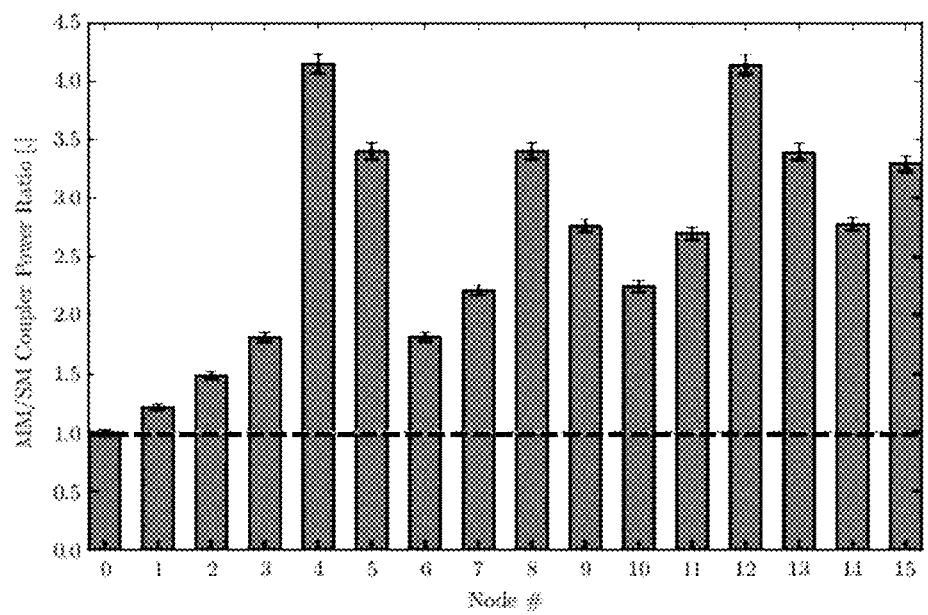
FIG. 4 illustrates the reduced loss for multimode compared to single mode for the different nodes, according to an embodiment of the present invention.

In another experiment, the overall loss between a single-mode junction and waveguide based reservoir and a multi-mode junction and waveguide based reservoir is compared. It thereby is to be noted that the performance on solving tasks is not substantially different but the losses occurring are substantially different. In FIG. 4, the power levels for a sixteen node reservoir are indicated whereby the single mode and the multimode reservoir are compared. The power ratio dividing the power of every node in the multimode reservoir by the power of the same node in the single mode reservoir is shown for a 1 bit delayed XOR task. Because the first node is used as input, its power did not change and its power ratio is equal to one. Except for node 1 and 2, all nodes clearly have a power ratio above the horizontal line that indicates where the ratio is equal to one. This which means that more power is measured in all those nodes for the multimode reservoir.

In a second aspect, the present invention relates to a photonics reservoir computing method. This method comprises the following steps described hereafter. Receiving one or more input signals at at least one output of the reservoir system. The input signal may be received by means of directly coupling in temporally varying optical waves or employing a transducing element to modulate photonic waves according to one or more input signals. Propagating delayed and reweighted versions of the one or more input signal inside the reservoir system, in which one or more multimode Y-junctions may act as splitters or combiners at the reservoir node sites that relay the incoming and outgoing optical reservoir signals travelling along multimode waveguides in a power-efficient way. Another example of propagation may be through a chaotic reservoir.

The method furthermore comprises probing one or more particular excitation states of the reservoir system at its node locations and routing them to a training module. It also comprises applying a linear weighting scheme to the one or more probed reservoir output signals in the readout section of the training module. The weighting scheme is capable of changing the amplitude 211 and phase 212 of the respective one or more optical signals 14. Combining the one or more modified optical signals of the readout stage 213 into a single output signal 22, e.g. through a cascade 214 of multimode Y-junctions 33 or through a merging section 214 of tapered multimode waveguides, but not limited thereto. Mapping the output signal 22 in a non-linear fashion, e.g. through the action of a photodetector element converting complex-valued optical signals into real-valued electrical power levels. Training the readout weights 211, 212 in a supervised manner so as the match the output signal 22 with a desired teacher signal for a particular task. Reconstructing the one or more probed reservoir states 14 as a required input to the learning algorithm. This reconstruction is achieved by simultaneously observing the output signal 22 and presenting the one or more input signals 11 multiple times, activating a single weight 211 at a time and driving it to the on-state '1', leaving the remaining weights in the off-state '0', and by activating pairs of weights, driving them to the on-state '1', or more generally to a non-zero state, while leaving all the other weights in their off-state '0'. This last step happens twice, to lift the pi degeneracy.

By way of illustration, embodiments of the present invention not being limited thereto, an example of the training of a photonic reservoir computing system as well as examples of readout operations are discussed, illustrating standard and optional features of embodiments of the present invention. Several options for such a training algorithm are discussed and a solution is proposed in which the complex states of the reservoir can be observed by appropriately setting the readout weights, while iterating over a predefined input sequence.

Figure 5:
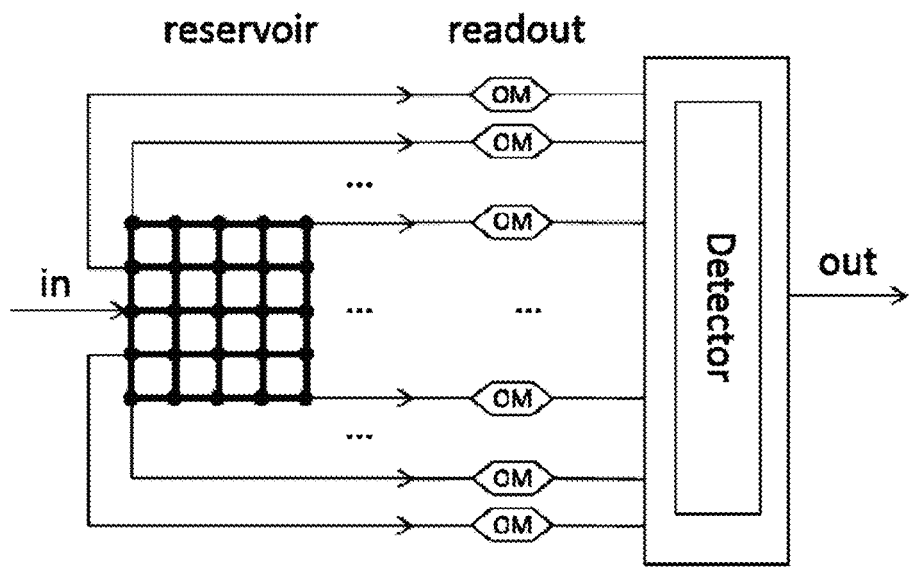
FIG. 5 shows a schematic representation of a reservoir computing system with a fully optical readout, according to embodiments of the present invention. In the embodiment shown, each optical output signal is modulated by an optical modulator (OM) implementing the weights. The optical outputs are then sent to a photodiode where all signals are summed and then converted to a final electric output signal.

Hence, it is desirable to perform the summing of signals in the optical domain instead of in the electrical domain. Using such an integrated optical readout, only a single photodetector, which receives the weighted sum of all optical signals, is required. A straightforward low-power optical weighting element can take the form of a reverse-biased pn-junction or a non-volatile optical weighting elements. FIG. 5 illustrates the concept of a fully optical integrated readout.

However, by employing such an integrated optical readout, one loses direct observability of the states of the photonic reservoir. Observing all states is mandatory though, in order to use classical linear readout training algorithms such as ridge regression and other least-squares approaches. It is to be noted that using a separate highspeed photodetector to each reservoir node, which is only used during training to observe the states is not considered a good solution since high-speed photodetectors tend to be costly in terms of chip footprint and since complicated coherent detectors would be required to measure the intensities of the states as well as their phases since the weights are complex-valued weights on complex-valued signals. It is also to be noted that training the weights based on simulations of the behaviour of a virtual reservoir, using photonic circuit simulation software, which will obviously have full observability of all the nodes, does not result in a straightforward solution. The fabrication tolerances of the devices are such that the propagation phase of two nominally identical waveguides could be completely different, prohibiting the successful transfer of weights trained using the idealized simulated reservoir to actual hardware.

In the present example, several approaches to train integrated photonic reservoirs without full state observability are evaluated. The behavior of photonic reservoirs with integrated optical readout is simulated and the simulated readouts of these reservoirs are trained to perform 3 bit header recognition. The approaches are evaluated by comparing their achieved bit error rates over a wide range of input signal bit rates.

In the present example, the complex-valued states of the reservoir are estimated using only the final photodiode by running a predetermined input sequence several times, while appropriately setting the readout weights. The estimated complex states are then used for classic training algorithms on a digital computer and the resulting weights can be programmed on the actual readout.

First, the methodology used is discussed. The achieved bit error rates of simulated reservoirs over a wide range of input signal bitrates are compared. The readout weights of simulated photonic reservoirs are trained with integrated optical readout to perform the 3-bit header recognition task. Our simulation setup builds upon the setup described by Katumba et al. in "A multiple input strategy to efficient integrated photonic reservoir computing" in Cognitive Computation vol. 9 (3) 2017 p 307-314, but the power on all the reservoir's nodes is not converted into the electrical domain prior to training. Instead an integrated optical readout is assumed operating directly on the optical signals of the reservoir which are complex-valued by nature.

Caphe, as described in Fiers et al. "Time-domain and frequency-domain modeling of nonlinear optical components at the circuit-level using a node-based approach" in J. Opt. Soc. Am. B, 29 (5) (2012) p 896-900, is used to simulate an optical circuit corresponding to an integrated 4×4 photonic reservoir using a swirl architecture as described in Vandoorne et al. "Experimental demonstration of reservoir computing on a silicon photonics chip" in Nature Communications 5 (3541) (2014). The intensity-modulated input signal was sub-sampled 24 times per bit period, smoothened using a first order Butterworth low-pass filter, and the response of the optical integrated swirl circuit was simulated using Caphe. A sampled complex output signal of each swirl node was obtained as result, denoting amplitude and phase of the optical signal at that node at a certain instance in time. The sampled complex optical signals at each reservoir node were arranged as a complex state-node matrix X∈C and the integrated optical readout was simulated by computing an inner product between this matrix and a complex weight vector w, which represents the complex optical weights. The resulting complex-valued signal was fed into a noisy photodetector model to obtain the electrical output signal of the integrated photonic reservoir. This output power signal was sampled in the middle of each bit period (of the respective input signal) and thresholded in order to obtain a clean binary output bit sequence. A threshold T was placed in the middle of the signal range of our output signal y[n] as $$T=\min(y[n])+(\max(y[n])-\min(y[n]))/2 \quad (1)$$

The reservoir's optical readout was simulated as $$y=\sigma(Xw) \quad (2)$$

where $X \in C^{N \times F}$ is the matrix of complex reservoir states, containing N samples of the complex signal occurring at F output channels of an integrated photonic reservoir. $w \in C^{F \times 1}$ is a vector holding the complex weights of the integrated optical readout.

$\sigma(a):C^n \to R^n$ is the mapping from the optical to the electrical domain that is realized by the photodetector. The photodetector model of Katumba et al. "A multiple input strategy to efficient integrated photonic reservoir computing" in Cognitive Computation vol. 9 (3) 2017 p 307-314 is used for all simulations and experiments. This model computes the electric current of a sampled complex signal a as $$i(a)=R|a|^2 \quad (3)$$

where R is the responsivity of the photodetector. To account for the limited bandwidth of the detector, a fourth-order Butterworth low-pass filter is applied to i. Thereafter, zeromean Gaussian noise with a variance $\sigma_n^2\_2n$ is added to the subsequent output. The variance $\sigma_n^2$ is computed as $$\sigma_n^2 = 2qB(\langle I \rangle + \langle I_d \rangle) + 4k_B TB/R_L \quad (4)$$

where q is the elementary particle charge, B is the bandwidth of the photodetector, $$\langle I \rangle = \frac{1}{N} \sum_n^N i[n]$$

is the photocurrent, $\langle I_d \rangle$ is the dark current, $k_B$ is the Boltzmann constant, T is the temperature and $R_L$ is the load impedance of the photodetector. In the simulations used the following settings were used: R=0.5, B=25 GHz, $\langle I_d \rangle$=0.1 nA, T=300K and $R_L$=1 MΩ.

The delay time between any two connected nodes in the simulated reservoir was fixed to 62:5 ps and it was assume that the waveguide loss was a rather pessimistic 3 dB/cm. The input signal was injected into the reservoir through nodes 5, 6, 9 and 10, where node indices are ordered row by row and from left to right. This input node configuration has been found previously to pose a good trade-off between performance and wiring effort, as described in Katumba et al. "A multiple input strategy to efficient integrated photonic reservoir computing" in Cognitive Computation vol. 9 (3) 2017 p 307-314.

As mentioned before, intensity modulation was used to encode our bit patterns into the optical signals sent to the simulated reservoir. Preliminary experiments have shown that adding a small bias to the input signal is beneficial to the overall performance of the system (in contrast to simply increasing amplitude energy by two times the bias). Therefore, a comparably small, constant amount of power was injected into the reservoir, even when a zero was encoded in the input signal. In more detail, a total power $p_{total}$=0.1 Watt was injected over the 4 input nodes, where 0.08 Watt was dedicated to the amplitude as well 0.02 Watt to the bias. Assuming an equal occurrence probability of the symbols 1 and 0 in the input bit signal, the average signal power amounts to 0.08 W*0.5+0.02 W=0.06 W.

Since one seeks to find a training algorithm that works well over a wide range of dynamics, the performance of the classifiers was assessed by training integrated photonic reservoirs excited by input signals over a wide range of bitrates. The bit rate of the input signal was swept in 1 Gbps steps between 1 and 31 Gbps. As a machine learning task to assess the performance of the classifiers, the header recognition task was used. The reservoir was expected to present 1 at the output whenever a certain sought header bit sequence occurs in the input signal and 0 otherwise. More precisely, given an input signal u[n] and a predefined header bit pattern h[n] the ideal desired signal $d_{ideal}[n]$ was defined to be $$d_{ideal}[n] = \begin{cases} 1 \text{ if } \sum_{m=0}^{M-1} [\![h(M-1)-m] = u[n-m]\!] - M \\ 0 \text{ else} \end{cases} \quad (5)$$

where the notation above is Iversons bracket notation, defined as $$[\![P]\!] = \begin{cases} 1 \text{ if } P \text{ true} \\ 0 \text{ else} \end{cases} \quad (6)$$

and M is the length of h[n] in bits. In this paper, M=3 and h[n]=δ+δ[(n−2)], where δ denotes the dirac delta function, and thus the header bit pattern we are looking for is "101".

The reservoir readouts are trained using a modified version of the ideal desired signal $$d[n] = d_{ideal}[n] \cdot p_{total} \quad (7)$$

where again $p_{total}$=0.1 W, the maximal attainable power of the input signal. 10000 random bits were randomly generated as training data as well as 10000 random bits of test data. To account for manufacturing variations, in general, each reservoir was simulated 10 times with identical train and test input, but different random phase configurations of the waveguides between nodes, as well as of the waveguides feeding the input signals to the nodes.

Subsequently the output weights were trained of the simulated readout for each instance.

To compare the performance of the trained classifiers, the bit error rate ⟨BER⟩ was used. The BER is defined as $$e_{bit} = \frac{1}{N} \sum_{n=1}^{N} [\![y_T[n] \neq d_{ideal}[n]]\!], \quad (8)$$

where $y_T[n]$ is the subsampled, thresholded output signal of the reservoir and $d_{ideal}[n]$ is again the ideal desired signal. With 10000 bits of test data, the minimal detectable bit error rate with a confidence level of ~90% is $10^{-3}$.

Focus is now made on the complex-valued ridge regression technique.

Consider again the model of an integrated optical readout as introduced above, defined as $$y = \sigma(Xw). \quad (9)$$

where $X \in \mathbb{C}^{N \times F}$ is the matrix of complex reservoir states, containing N samples of the complex signal occurring at F output channels of an integrated photonic reservoir. $w \in \mathbb{C}^{F \times 1}$ is a vector holding the complex weights of the integrated optical readout. $\sigma(a): C_n \rightarrow R^n$ is the mapping realized by the photodetector of the readout.

Contrary to classic reservoir readouts, the readout weights of this model do not lie after the reservoir's nonlinear detector function, but before it. This implies that any result of the dot product Xw of the model will be passed through this nonlinear function. Consequently, if the readout weights are trained in a classical way, using ridge regression, the desired product vector d of states and readout weights will be transformed by the detector output function. In more detail if one trains was $$w = (X^H X + \alpha^2 I)^{-1} X^H d, \quad (10)$$

where $\alpha \in \mathbb{R}$ is the regularization strength and $I \in \mathbb{R}^{F \times F}$ is the identity matrix. Assuming w is ideal, $$\sigma(Xw) = \sigma(d). \quad (11)$$

Therefore, at the model output, one obtains $$y = \sigma(Xw) = \sigma(d). \quad (12)$$

Since the model preferably outputs d rather than σ(d), one needs to find an approximate inversion of the readout nonlinearity $\hat{\sigma}^{-1}$ to invert σ such that $$\sigma(\hat{\sigma}^{-1}(d)) \approx d. \quad (13)$$

Therefore w is trained as $$w = (X^H X + \alpha^2 I)^{-1} X^H \hat{\sigma}^{-1}(d), \quad (14)$$

The detector model of Katumba et al. can be approximated as a function in closed form, if one neglects its bandlimiting lowpass filter for simplicity:

$$\sigma(a) = R|a|^2 + n. \tag{15}$$

Again, R denotes the responsivity of the photodetector and n is a noise vector. One can see that σ(a) cannot be inverted exactly, primarily since the absolute value of a is taken, and also due to the added, unknown noise vector. Nevertheless one can approximate the inverse of the detector function above as $$\hat{\sigma}^{-1}(y) = \sqrt{\frac{y}{R}}. \tag{16}$$

By doing so, one minimizes the sum of squared errors $$\sum_{n=0}^{N} \left[ (x^{(n)}w) - \sqrt{\frac{d[n]}{R}} \right]^2 \tag{17}$$

where the row vector is denoted with index n of X as $x^{(n)}$. While this approach obviously can not be used on actual devices due to the fact that the optical signals on the chip are not observable, its similarity to classic, real-valued training approaches makes it a suitable candidate to be used as a baseline to assess and compare novel training approaches for actual integrated reservoirs. Whenever reference is made to this baseline it is plainly called complex-valued ridge regression. Whenever classifiers are trained using complex-valued ridge regression, 5-fold cross validation is used to find a suitable regularization parameter α for an optimal training result.

Figure 6:
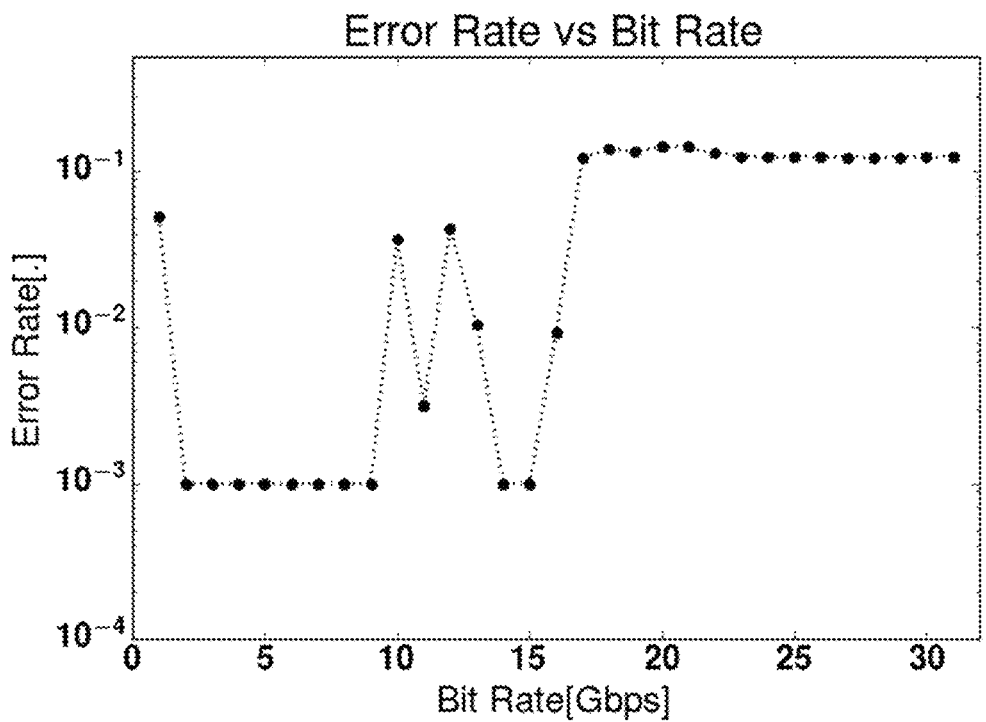
FIG. 6 illustrates bit error rates as a function of input signal bitrate for the baseline approach with complex-valued ridge regression according to an embodiment of the present invention. In the example shown, classifiers have been trained to perform 3-bit header recognition (pattern 101) on a 4×4 photonic swirl reservoir. The results are averaged over 10 different reservoirs and the minimal detectable error rate is $10^{-3}$.

The performance of this baseline is assessed by training integrated photonic reservoirs for different input signal bitrates on the 3-bit header recognition task. FIG. 6 shows the achieved bit error rates.

As one can see, the proposed baseline works well for bitrates at the lower end of our considered range.

Since the states of the integrated photonic reservoir are not observable, a straight-forward approach is to train the readouts using a black-box optimization approach. Among these, CMA-ES appears to be a suitable candidate, since it usually deals well with non-convex search spaces, which are likely to occur for the problem since optimization is performed in the complex domain. Integrated photonic reservoirs can be trained using CMA-ES by transferring a candidate value suggested by the algorithm to the reservoir's readout weights, presenting the training bit sequence to the reservoir, computing a chosen loss function from the reservoir's subsequent output and feeding that error measure back to the CMA-ES algorithm.

The algorithm traverses the loss function space suggesting new candidates to minimize the loss function. The real and imaginary parts of the complex weight vector w∈C are encoded into a real-valued vector $$w' = \begin{pmatrix} \text{Re}(w) \\ \text{Im}(w) \end{pmatrix} \tag{18}$$

prior to handing it to the CMA-ES algorithm. The inverse transformation is applied to weight vectors suggested by the algorithm before setting them to the readout. The algorithm is initialized with a zero vector $w'_0 = 0$ and sweeps are performed over the initial variance in steps of one decade between $10^{-5}$ and $10^2$. As recommended, the population size is set to $4 + \lfloor 3 \log(F) \rfloor$. Note that one might achieve better results by cross-validating initial variance and population size, from which we refrain due to the typical very long training times of CMA-ES. As an objective function, the sum of squared errors is minimised $$e_{SSE} = \sum_{n=1}^{N} (y[n] - d[n])^2. \tag{19}$$

Figure 7:
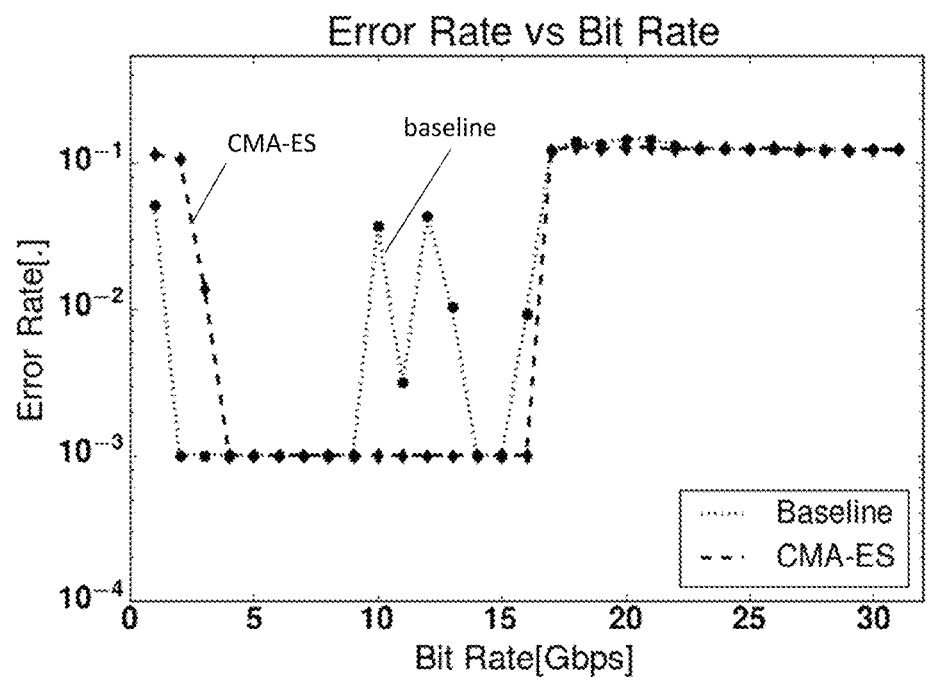
FIG. 7 illustrates bit error rates as a function of input signal bitrate for the black-box approach, CMA-ES according to an embodiment of the present invention. Baseline approach is shown for comparison. In the example shown, classifiers have been trained to perform 3 bit header recognition (pattern 101) on a 4×4 photonic swirl reservoir. The results are averaged over 10 different reservoirs and the minimal detectable error rate is $10^{-3}$.

The performance of CMA-ES is assessed by training integrated photonic reservoirs with different input signal bitrates on the 3-bit header recognition task. FIG. 7 shows the resulting error rates (results are averaged over 10 different reservoirs).

As one can see, CMA-ES attains the minimal detectable bit error rate of 10□3 for a wide range of the considered bitrates. It works better than the proposed baseline, and therefore is in principle capable of training integrated photonic reservoirs. However, because CMA-ES typically involves high training time and requires many iterations of the input data, we run an additional experiment investigating its convergence behavior.

Figure 8:
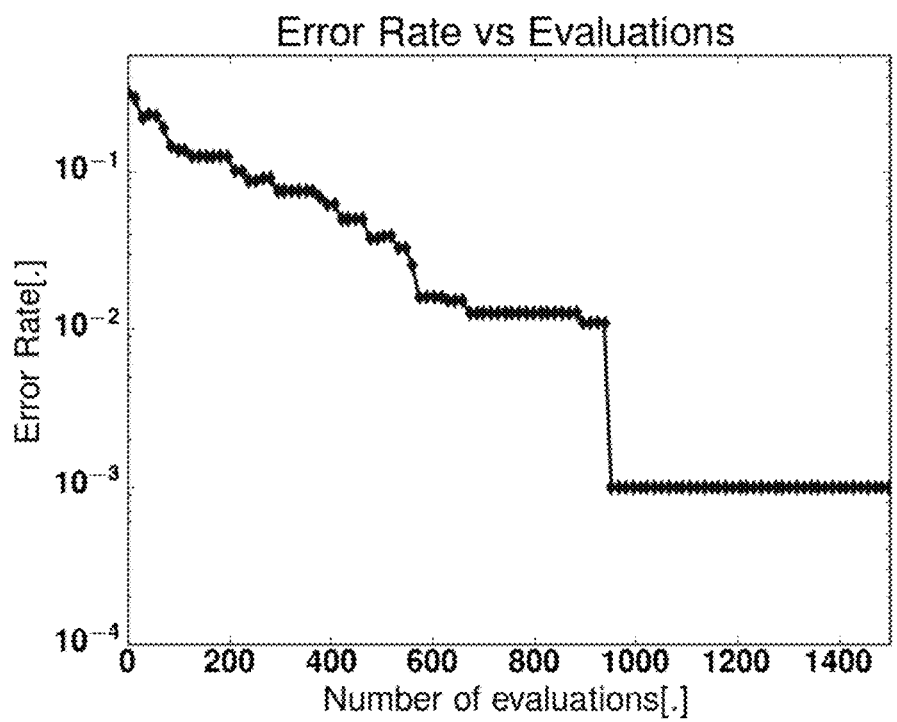
FIG. 8 shows the bit error rate as a function of iterations over the training data for CMA-ES according to an embodiment of the present invention. In the example shown, classifiers have been trained to perform 3-bit header recognition (pattern 101) on a 4×4 photonic swirl reservoir. The results are averaged over 10 different reservoirs and the minimal detectable error rate is $10^{-3}$.

A photonic reservoir is simulated and trained with CMA-ES where the error rate is recorded at each iteration. The results are again averaged over 10 simulated reservoirs driven by a bit rate of 10 Gbps to obtain the graph seen in FIG. 8.

The results of this experiment show that the full input training sequence needs to be presented about 1000 times before CMA-ES reaches satisfactory results. Since a short training process on the actual hardware is mandatory for our devices in order to obtain mass-market maturity, a way to drastically reduce the number of necessary iterations over the input is necessary. Since stand-alone CMA-ES training converges too slowly, a promising alternative is the pretraining of models in simulation and the refining them using CMAES on the actual devices to speed up the training process.

The feasibility of such a pretraining-retraining approach was tested as described below. As already mentioned, training reservoirs in simulation utilizing full observability, and subsequently transferring the trained weight vector to hardware is not possible, due to the fabrication tolerances of integrated photonic reservoirs. However, as a possible extension of this approach, a pretraining-retraining technique is a promising alternative. Here, readout weights are also first trained using a simulated virtual reservoir on a digital computer. After transferring the weight vector to actual hardware, the weights are refined using a black-box optimization algorithm. Nevertheless, such an approach is only feasible if it can be ensured that the algorithm that retrains the actual integrated circuit converges significantly faster as a result of using an initialisation based on pretraining. An experiment was performed to assess the feasibility of a pretraining-retraining approach in the light of the high variations in phase to be expected in between reservoirs. This is done by training the weights of a simulated reservoir with integrated readout using complex-valued ridge regression. The bit rate of the input signal was chosen such that the minimal detectable bit error rate of $10^{-3}$ was attained, i.e. 5

Figure 9:
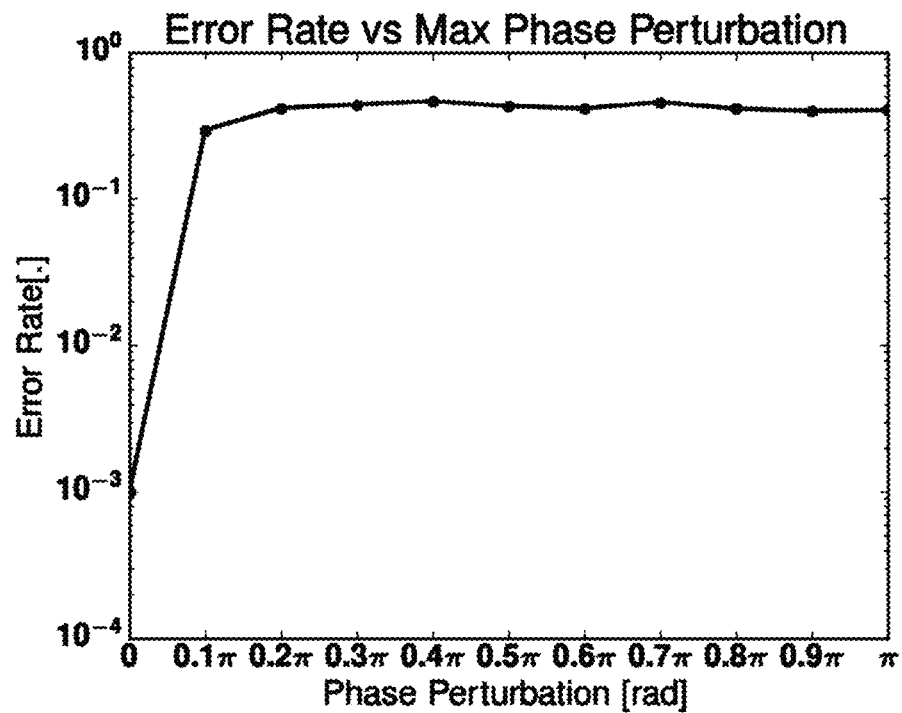
FIG. 9 shows the bit error rate for the 3 bit header recognition task (pattern 101) as a function of increasing ranges of the uniformly distributed phase noise added to the reservoir's waveguides according to an embodiment of the present invention. The readout has been trained using complex-valued ridge regression on a 4×4 photonic swirl. Data shown is averaged over 100 instances of random noise per data point, which has been applied to 10 different initial reservoirs. The minimal detectable bit error rate is $10^{-3}$.

Gbps. Subsequently, the reservoir was resimulated while adding uniformly distributed phase noise $\eta \sim \mathcal{U}(0,b)$ to the input and connection waveguides of the reservoir. The previously trained readout weight vector was then reapplied to the newly simulated reservoir and the resulting bit error rate was recorded. The procedure described above (add noise, solve task with previously trained weight vector, note achieved BER) was performed for a set of ranges b between 0 and $\pi$, and the procedure was repeated 10 times for each value of b. In order to account for different initial configurations as well, the whole procedure described above was repeated 10 times, training 10 different readout weight vectors for 10 reservoirs with different random phase configuration. Therefore, in total 10 trained weight vectors were applied to 100 simulated reservoirs per data point in FIG. 9, which shows the results.

As can be seen, for the chosen setup, the bit error rate already increases by two orders of magnitude for very low amounts of random phase noise which seems to render a pretraining-retraining approach challenging. Therefore a radically different approach was further pursued, in which the reservoir's states were estimated through the available photodetector in order to train a weight vector from the actual states on a digital computer. This weight vector can then be transferred back to the hardware where no significant increase in error is to be expected.

Consider again the model of an integrated optical readout as introduced above, defined as $$y = \sigma(Xw). \tag{20}$$

as well as the closed form approximation of the photodetector function $$\sigma(a) = R|a|^2 + n. \tag{21}$$

as well as its approximate inversion $$\hat{\sigma}^{-1}(y) = \sqrt{\frac{y}{R}}, \tag{22}$$

introduced above. $\hat{\sigma}^{-1}$ can be used to estimate the reservoir state matrix |X| when it cannot be observed directly. Indeed, taking a closer look at Equation 20, one can see that it is possible to observe the powers of the state matrix X through an appropriate selection of the input weight vector w.

If one chooses $$w = \begin{pmatrix} 1 \\ 0 \\ \vdots \\ 0 \end{pmatrix} \tag{23}$$

as a weight vector and present an input signal u[n] to the input of the integrated photonic reservoir, we obtain $$y = \sigma(x_1) = R|x_1|^2 + n, \tag{24}$$

at the output of the integrated readout, where x1 is the first column of the state matrix X. Since one can observe $R|x_1|^2 + n$, one can estimate the modulus $|x_1|$ of $$x_1 = |x_1| \exp(j \arg(x_1)). \tag{25}$$

If one neglects n, assuming R is known, one can apply $\hat{\sigma}^{-1}$ to y and estimate $|x_1|$ as $$|x_1| = \hat{\sigma}^{-1}(R|x_1|^2 + n) = \sqrt{|x_1|^2 + \frac{n}{R}}. \tag{26}$$

Figure 10:
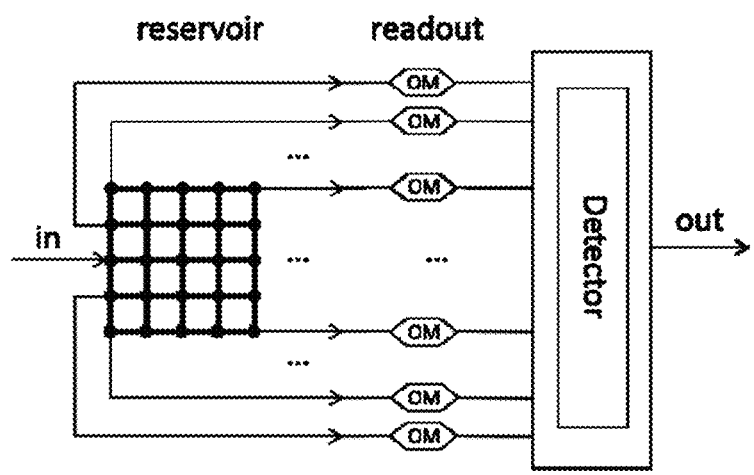
FIG. 10 shows a modulus observation procedure as can be used in an embodiment of the present invention, wherein one weight is set to 1 and all remaining weights are set to 0, whereby the observable output is the square of the modulus of the corresponding reservoir state.

Since the above operation is an approximate inversion of the nonlinearity of the photodetector, the method is referred to as nonlinearity inversion. Repeating this procedure for every channel of the readout/column of the state matrix, we are able to estimate the moduli of state values in the state matrix |X|. See FIG. 10 for illustration. Nevertheless, in order to tune the weights of the integrated optical readout, one needs information about the arguments (the phases) of |X| as well. Absolute phase information about the states is lost as soon as it passes the photodetector. However, only the relative phases between states are of interest since they influence the output sum of the readout.

Consider two given complex state values $x_{(t,k)}$ and $x_{(t,l)}$ at a certain instant in time t, with moduli $P_k$ and $P_l$ as well as the modulus $P_{kl}$ of their sum $P_{kl} \exp(j\phi_{kl}) = P_k \exp(j\phi_k) + P_l \exp(j\phi_l)$. The absolute value of their relative phase difference $\phi_{kl} = \phi_k - \phi_l$ can be computed using the phase estimation equation $$|\phi_{kl}| = \arccos\left(\frac{P_{kl}^2 - (P_k^2 + P_l^2)}{2 P_k P_l}\right). \tag{27}$$

Due to the fact that arccos(x) is injective in the sense that for any given input x there are two possible solutions on the interval $[-\pi,\pi]$, using Equation 27 we can only find the absolute value $|\phi_{kl}|$, while the sign of $(\phi_{kl})$ remains unknown. To resolve this issue, one performs this estimation of $\phi_{kl}$ twice with different values $P_{kl}$ and $P'_{kl}$: While $P_{kl}$ is being computed as shown before, a phase difference of $\pi/2$ is added to state k such that $$P'_{kl} = \left| P_k \exp(j\phi_k) \exp\left(j\frac{\pi}{2}\right) + P_l \exp(j\phi_l) \right|^2 \tag{28}$$
$$= |P_k \exp(j\phi'_k) + P_l \exp(j\phi_l)|^2.$$

By comparing the estimates of $|\phi_{kl}|$ and $$|\phi'_{kl}| = \arccos\left(\frac{P'^2_{kl} - (P_k^2 + P_l^2)}{2 P_k P_l}\right), \tag{29}$$

the sign of $\phi_{kl}$ can be inferred.

$$\phi_{kl} = \begin{cases} |\phi_{kl}| & \text{if } |\phi'_{kl}| \in \left[0, \frac{\pi}{2}\right] \\ -|\phi_{kl}| & \text{else} \end{cases} \tag{30}$$

Figure 11:
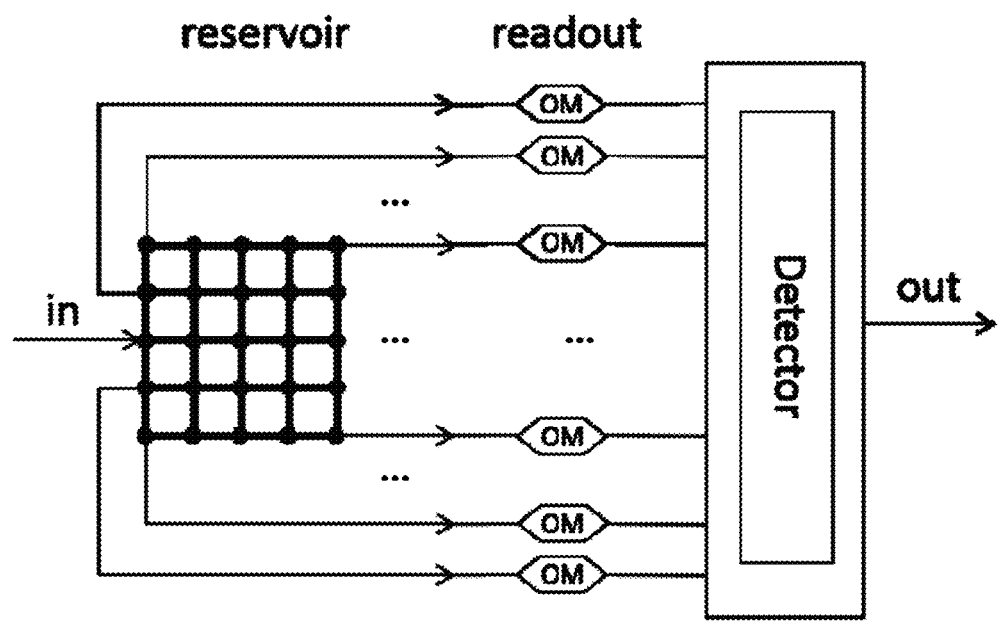
FIG. 11 shows a phase estimation procedure as can be used in an embodiment of the present invention, wherein two weights are set to 1 while the remaining weights are set to 0. This results in the power of the summed states at the output, allowing to calculate the argument (phase angle) between states of the highlighted channels via the relationship of the sum power and the powers of the individual states obtained e.g. using the technique shown in FIG. 10.

For illustration, see FIG. 11.

Since $$|P_k \exp(j\phi_k) + P_l \exp(j\phi_l)| = |P_k + P_l \exp(j\phi_{kl})| \tag{31}$$

and thus in consequence $$\left| P_k \exp(j\phi_k) + \sum_{\forall q \neq k}^{\forall q \neq k} P_q \exp(j\phi_q) \right| = \left| P_k + \sum_{\forall q \neq k}^{\forall q \neq k} P_q \exp(j\phi_{kq}) \right|. \quad (32)$$

one can pick a certain state $x_{(t,k)}$ as reference state and determine the relative phase $\phi_{kq}$ between the value of this state x(t,k) and the value of every other state x(t,q). After having estimated each reservoir state this way, complex-valued ridge regression can be applied to find the optimal weights for the reservoir.

In summary, after presenting the same input 3F−2 times, with F being the number of output channels, the full complex time evolution of each of the F output channels can be measured, even though there is only a single detector.

This information can then be used to calculate the required weights in a single pass in software. As was discussed above, 3F−2 measurements is much less than what is typically necessary using CMA-ES. In addition, it is also a deterministic number, in contrast to a black-box optimization technique, for which it is hard to determine beforehand how many iterations will be needed.

In the experiments, the repeated measurements for the nonlinearity inversion procedure were simulated by setting the corresponding rows of the weight vector in the readout model according to the estimation procedure. For every setting of the weight vector the complete model of the readout was applied. The corresponding output signal from the detector was collected and any samples of the output signal smaller than 0 (which might occur due to noise or ringing of the bandlimiting filter of the photodetector) were replaced with 0.

Figure 12:
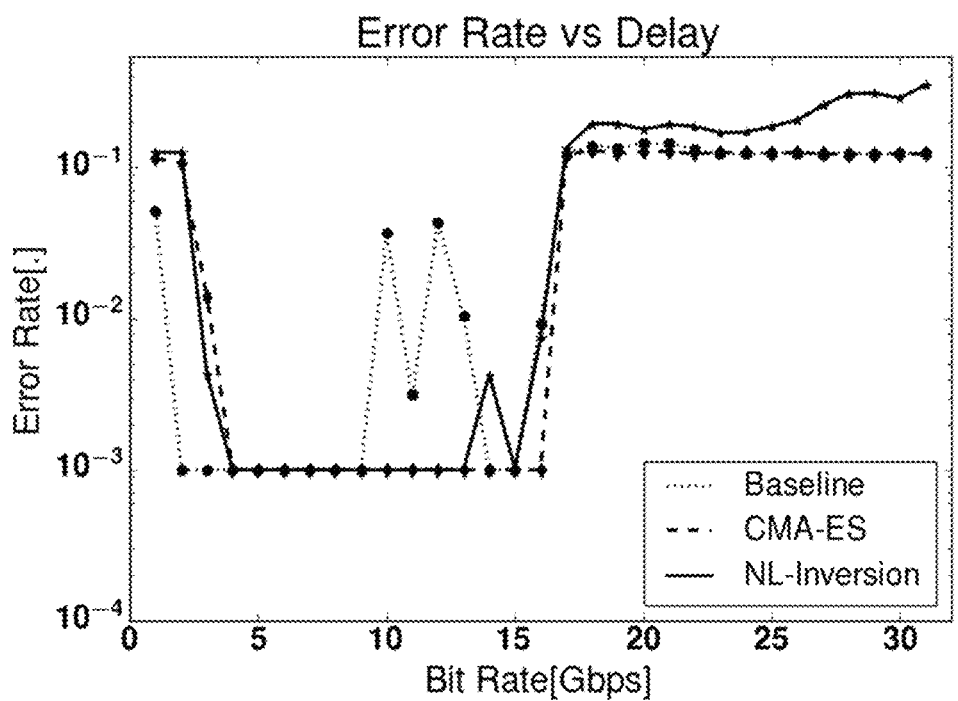
FIG. 12 shows bit error rates as a function of input signal bitrate for nonlinearity inversion according to an embodiment of the present invention. Baseline and CMA-ES approaches are shown for comparison. In the example shown, classifiers have been trained to perform 3 bit header recognition (pattern 101) on a 4×4 photonic swirl reservoir. The results are averaged over 10 different reservoirs and the minimal detectable error rate is $10^{-3}$.

Thereafter X was estimated using Equations 22, 27 and 30. Integrated photonic reservoirs with input bit rates between nodes on the 3-bit header recognition task were trained again to assess the performance of the proposed method. FIG. 12 shows the bit error rate as function of the input signal bit rate.

The nonlinearity inversion approach performs only slightly worse than the CMA-ES approach and slightly better than complex-valued ridge regression baseline. Especially the latter fact is remarkable, since the nonlinearity inversion approach operates on an estimate of the states used by the baseline.

A possible explanation for this phenomenon is that the noise introduced by the detector model in the estimation step acts as an additional regularizer for training. In a nutshell, since nonlinearity inversion shows only slightly worse performance than CMA-ES while requiring significantly less (3F−2=3×16−2=46 times) iterations of the input data, it appears to be the most suitable among the training approaches for integrated photonic reservoirs that have been investigated.

The above example illustrates a successful method for training such reservoirs according to an embodiment of the present invention, the training method being referred to as nonlinearity inversion. It illustrates that embodiments of the present invention can essentially resolve the issue of limited observability of the states of an integrated photonic reservoir by estimating the reservoir's states through a single photo-detector at its output. The method is based on iterating over the training data several times while setting the weights according to a certain pattern. The recorded output signals allow to estimate the amplitude and phase of the reservoir's states within 3F−2 iterations over the training data.

It is shown that this method performs similarly to a classic training approach, which requires full observability. While the CMA-ES black box algorithm is still slightly better with respect to task performance, the method requires significantly fewer iterations over the input data. It can be concluded that nonlinearity inversion allows training integrated photonic reservoirs.

The invention claimed is:

1. A photonics reservoir computing system comprising a training module and a plurality of output channels, the reservoir computing system being configured for propagating at least one optical signal so as to create resulting radiation signals in the output channels, the training module further comprising:
   weighting elements for weighting the radiation signals in the output channels in an optical domain,
   a combining stage for creating a combination of the weighted radiation in the optical domain, and
   at least one optical detector for optically detecting said combination of the weighted radiation signals,
   wherein the training module is configured for iterating over training data several times while adjusting the weighting elements according to a predetermined pattern, thereby estimating the resulting radiation signals in the output channels through an output of the at least one optical detector.

2. The photonics reservoir computing system according to claim 1, wherein the training module is configured to estimate the resulting radiation signals in the output channels by determining a power in different output channels of the system and a phase difference between the different output channels of the system.

3. The photonics reservoir computing system according to claim 1, the training module being adapted for estimating the amplitude and phase of the resulting radiation signals in the output channels by at most 3F−2 iterations over the training data,
   wherein F is the number of output channels.

4. The photonics reservoir computing system according to claim 1, wherein the at least one optical detector is a large area optical detector configured for performing a non-linear operation on the combination of the weighted resulting radiation signals.

5. The photonics reservoir computing system according to claim 1, wherein the weighting elements comprise reverse biased pn junctions for weighting the resulting radiation signals.

6. The photonics reservoir computing system according to claim 1, wherein the training module is configured for obtaining training data whereby weighting coefficients are selected by subsequently selecting one of the weighting coefficients equal to 1 (a.u.), while setting all other weighting coefficients to 0, and by selecting two of the weighting coefficients non-zero, while setting all other weighting coefficients to 0.

7. The photonics reservoir computing system according to claim 1, wherein the system comprises a silicon photonics reservoir.

8. The photonics reservoir computing system according to claim 1, wherein the system comprises a plurality of discrete nodes interconnected via optical interconnections for propagating the at least one optical signal between the nodes so as to create the resulting radiation signals.

9. The photonics reservoir computing system according to claim 1, wherein the system comprises a chaotic reservoir.

* * * * *